United States Patent [19]

Fischell

[11] 3,867,950

[45] Feb. 25, 1975

[54] FIXED RATE RECHARGEABLE CARDIAC PACEMAKER

[75] Inventor: Robert E. Fischell, Silver Spring, Md.

[73] Assignee: The Johns Hopkins University, Baltimore, Md.

[22] Filed: June 18, 1971

[21] Appl. No.: 154,492

[52] U.S. Cl. .......... 128/419 P
[51] Int. Cl. .......... A61n 1/36
[58] Field of Search..... 128/419 P, 419 R, 421–423, 128/2.1 R, 2 P, 2 H

[56] References Cited

UNITED STATES PATENTS

| | | | |
|---|---|---|---|
| 3,231,834 | 1/1966 | Watanabe | 128/2.1 R |
| 3,311,111 | 3/1967 | Bowers | 128/419 P |
| 3,345,990 | 10/1967 | Berkovitz | 128/419 P |
| 3,348,548 | 10/1967 | Chandack | 128/419 P |
| 3,454,012 | 7/1969 | Raddi | 128/419 P |
| 3,474,353 | 10/1969 | Keller, Jr. | 128/419 P |
| 3,478,746 | 11/1969 | Greatbatch | 128/419 P |
| 3,486,506 | 12/1969 | Auphan | 128/419 P |
| 3,523,539 | 8/1970 | Lavezzo et al. | 128/419 P |
| 3,638,656 | 2/1972 | Grandjean et al. | 128/419 P |
| 3,690,325 | 9/1972 | Kenny | 128/419 P |

FOREIGN PATENTS OR APPLICATIONS

| | | | |
|---|---|---|---|
| 87,174 | 5/1966 | France | 128/419 P |

OTHER PUBLICATIONS

Davies, "Journal of the British Institute of Radio Engineers", Vol. 24, No. 6, Dec. 1962, pp. 453–456.

*Primary Examiner*—William E. Kamm
*Attorney, Agent, or Firm*—Robert E. Archibald; John S. Lacey

[57] ABSTRACT

An improved fixed-rate cardiac pacer or stimulator adapted for human implantation which utilizes, as its power source, a single, rechargeable cell battery which is recharged through the patient's skin by magnetic induction. The rechargeable battery supplies operating energy to transistorized pulse generating circuitry which is of simplified and fail-safe design effective to produce periodic heart stimulating output pulses at a controlled pulse rate. The electronic pulse generating circuitry is purposely designed such that the output pulse rate varies as a function of the battery voltage and also as a function of body temperature. The mechanical design of the rechargeable pacer or stimulator is compact in order to reduce volume and weight of the device; it is constructed of materials making it more acceptable to human implantation; and, it is hermetically sealed to prevent the infusion of body fluids and at the same time provide shielding against electromagnetic interference.

15 Claims, 12 Drawing Figures

INVENTOR.
ROBERT E. FISCHELL
BY John S. Lacey
ATTORNEY

INVENTOR.
ROBERT E. FISCHELL
BY John S. Lacey
ATTORNEY

INVENTOR.
ROBERT E. FISCHELL
BY John S. Lacey
ATTORNEY

INVENTOR.
ROBERT E. FISCHELL
BY John S. Lacey
ATTORNEY

FIXED RATE RECHARGEABLE CARDIAC PACEMAKER

BACKGROUND OF THE INVENTION

In the normal heart, electrical stimulus generated within a small region of the right atrium called the sinoatrial node is transmitted to the ventricles where it produces a contracting or beating of this section of the heart. As a result of heart disease, this normal conduction of electrical stimulus within the heart can be interrupted and thereby cause the heart to stop beating at its normal rate.

At best, such a condition would very seriously restrict a persons physical activities and at worst could result in an insufficient blood flow capable of causing failure of the kidneys, liver and other vital organs. This has led to the development of electronic pulse generators or so-called "cardiac pacemakers" which can be implanted in the body to artificially stimulate the heart to beat at a normal rate.

Early implantable pacing systems used electrodes sewn onto the exterior wall of the heart. This required an open chest operation with considerable hazard to the patient. The electrode leads were routed under the skin and connected to a pulse generator which was buried under the skin, usually in the upper abdomen. The requirement for this major surgery with its attendant high risk was eliminated by the development of an endocardial electrode which could be inserted into the heart through a vein without requiring a major operation. When using an endocardial electrode, the pulse generator would typically be placed in the upper left portion of the chest under the skin and outside the rib cage. In this region a catheter wire would be inserted into a small vein and extended into the heart, where the electrodes at the end of the catheter would finally be wedged into the heart muscle at the bottom of the right ventricle. The catheter would then be tied in place at the vein where it entered the venous system with a permanent suture. The electrical pulses from the pulse generator, transmitted through the insulated catheter wire and emanating from the electrodes firmly wedged against the inner (endocardial) surface of the right ventricle, would cause the heart to beat at a rate determined by the pulse generator frequency.

Early cardiac pacer or stimulator applications also encountered problems of catheter breakage, especially when the pulse generator was located in the abdominal region. With the trend toward use of endocardial catheters, but more importantly, with the development of new alloys and the coil-spring electrode catheter, the problem of electrode breakage has been greatly reduced. Moreover, there have been essentially no problems of blood clotting around the endocardial catheters. Currently available electrode catheters are therefore generally considered satisfactory for management of pacing problems.

On the other hand, most of the previously proposed cardiac pacer or stimulator do suffer from two major draw-backs; i.e., the relatively short operating lifetime for the currently used power sources and the size and weight of the pulse generator circuitry. More specifically, many of the existing implantable pulse generators are powered by mercury cells which cannot be recharged and therefore have a relatively short operating life span. This, in turn, requires that a person with such an implantable pacer or stimulator be hospitalized periodically (approximately every 18 months), in order to have the old unit removed by opening the pocket under the skin where the pulse generator was placed and have a new generator connected to the catheter and sewn into the pocket. Obviously, there is some risk of infection in this repeated pulse generator change and this risk is greatly increased where, as here, a pocket has been created in the body tissues and a foreign body inserted therein. Moreover, many patients abhor the thought of such recurring operations. In particular, it is often noted that many cardiac patients are understandably more fearful of surgical procedures than people with normal heart function and some patients have, in fact, refused the benefits of implanted pacing systems because of this dread of recurring surgery. Any pacing system that does not require re-entering the body after the initial implantation would thus be of great benefit.

The size and weight of most currently available pulse generators is also a problem, especially in small children who need heart pacing as a result of cardiac surgery and in elderly patients where the weight of the pulse generator has sometimes caused it to slowly slide down between the layers of tissue and exert excessive pull on the catheter and its connected electrode. The limiting factor in reducing the size and weight of the pulse generator is the power source. Unfortunately, no other primary cells available today can appreciably improve upon the weight/volume requirements of the currently used mercury cells.

A major advance in the field of cardiac pacing was thus recently attained by the utilization of a small, long-life secondary (i.e. rechargeable) single cell battery to replace the more bulky primary multicell unit for supplying the operating energy to the transistorized pulse generating circuitry. For example, a single cell nickel-cadmium battery has previously been suggested for such pacer application and has been found to be an excellent rechargeable power source for this purpose. In fact, the presently preferred embodiment of the proposed cardiac pacer constituting the present invention utilizes such a single Ni-Cd cell. Another advantage of such a secondary cell is that it can be recharged without mechanically penetrating the skin. This is obviously desirable from the standpoint of reducing infection possibilities.

On the other hand, there is still considerable need for improvement in currently available cardiac pacers; both the permanently implantable type which utilizes the rechargeable or secondary battery power supply and the type which needs to be periodically replaced. For example, the pulse generating circuitry is often quite complex and requires an excessive number of bulk electronic components. Moreover, the pulse generating circuitry of previously proposed pacers generally lacks a fail-safe design and can therefore cause very serious problems for the patient if it malfunctions. With regard to the rechargeable pacers, in particular, full advantage has not yet been taken of their permanently implantable nature, especially form the standpoints of: more completely simulating natural heart functioning; better utilization of the patient's pulse rate to monitor the operating condition of the pacer; mechanically designing the pacer to make it better suited for human implantation; and, making the pacer more flexible by providing for remote or external adjustment of the pacing rate.

SUMMARY OF THE INVENTION

In view of the foregoing, it is proposed in accordance with the present invention to provide an improved rechargeable, fixed-rate cardiac pacer or stimulator which overcomes these previously mentioned deficiencies of currently available pacers. More specifically, in the preferred or illustrated embodiment, a single cell rechargeable nickel-cadmium battery is utilized to energize simplified and fail-safe pulse generator circuitry which produces output heart stimulating pulses at a fixed or controlled pulse rate. In a modified version of the pacer, its flexibility is increased by incorporating the capability of remotely selecting between a plurality of output pulsing rates. The shape of these output pulses is chosen so that the desired triggering of the heart can be accomplished while preventing any net ion flow in the blood near the catheter electrodes.

Energy for recharging the single Ni—Cd cell is coupled through the patient's skin by magnetic induction between an external charging head and a ferrite core input transformer disposed just under the skin. The external charger utilizes an ultrasonic frequency (e.g. 25 kilohertz) selected to avoid both the undesirable heating of the skin which has been found to take place when radio frequency (R.F.) energy is used and the irritating vibrations which the patient may experience at the lower (audible) frequencies. The use of frequencies below the ultrasonic range is also undesirable in that larger components are required to receive the inductively coupled energy. In the proposed pacer, the charging energy which is coupled to the input transformer is then full-wave rectified, filtered and applied to the single cell battery through a simple field effect transistor (FET) current limiting circuit which prevents the battery charge current from exceeding a preselected value which can be continuously applied without damage to either the Ni—Cd cell or the remaining pacer circuitry.

The actual pulse generating circuitry of the proposed pacer comprises a simple, two transistor relaxation oscillator type circuit, employing regenerative feedback between the transistors so that the output pulses have fast rise and fall times. The rate at which the output pulses are generated is purposely allowed to vary as a function of battery voltage, in order to enable the patient's pulse rate to serve as an indication of battery condition. Moreover, the pulse generating circuitry is also designed so that output pulse rate increases with increasing body temperature and thereby more accurately simulates the natural functioning of the heart in the human body. Finally, the output step-up transformer which couples the generated pulses to the catheter is designed to prevent unwanted signals from appearing on the catheter wires, for example, A.C. noise which may be present especialy during the recharging operation and/or steady D.C. in the event of transistor failure in the pulse generator. Either type of signal, if it reaches the heart, could cause fatal ventricular fibrillation.

The proposed cardiac pacer also has a much improved mechanical design, when compared with currently available pacers. Specifically, the proposed pacer is more suitable for human implantation in that it is provided with a metallic coating or housing which acts not only to hermetically seal or protect the electronic components against infusion of body fluids but also to electromagnetically shield them from electromagnetic interference. The mechanical design of the proposed device is also compact and lightweight, yet comparatively quite rugged.

In view of the above, one object of the present invention is to provide an improved rechargeable, fixed-rate cardiac pacer or stimulator.

Another object of the present invention is to provide an improved fixed-rate cardiac pacer or stimulator which utilizes a single cell rechargeable battery as the power source for transistorized pulse generating circuitry to produce output heart stimulating pulses.

Another object of the present invention is to provide a cardiac pacer or stimulator wherein the pulse generating circuitry is of a fail-safe design.

Another object of the present invention is to provide a cardiac pacer or stimulator wherein the output pulse rate is permitted to vary as a function of battery voltage.

Another object of the present invention is to provide a cardiac pacer or stimulator wherein the output pulse rate increases with increasing body temperature so as to more accurately simulate the natural functioning of the heart.

Another object of the present invention is to provide an improved implantable cardiac pacer or stimulator wherein any one of a plurality of output pulse rates is selectable remotely.

Another object of the present invention is to provide a cardiac pacer or stimulator which is hermetically sealed against the outside environment and is shielded against electromagnetic interference.

Other objects, purposes and characteristic features of the present invention will in part be pointed out as the description of the invention progresses and in part be obvious from the accompanying drawings wherein.

Figures 1, 2:
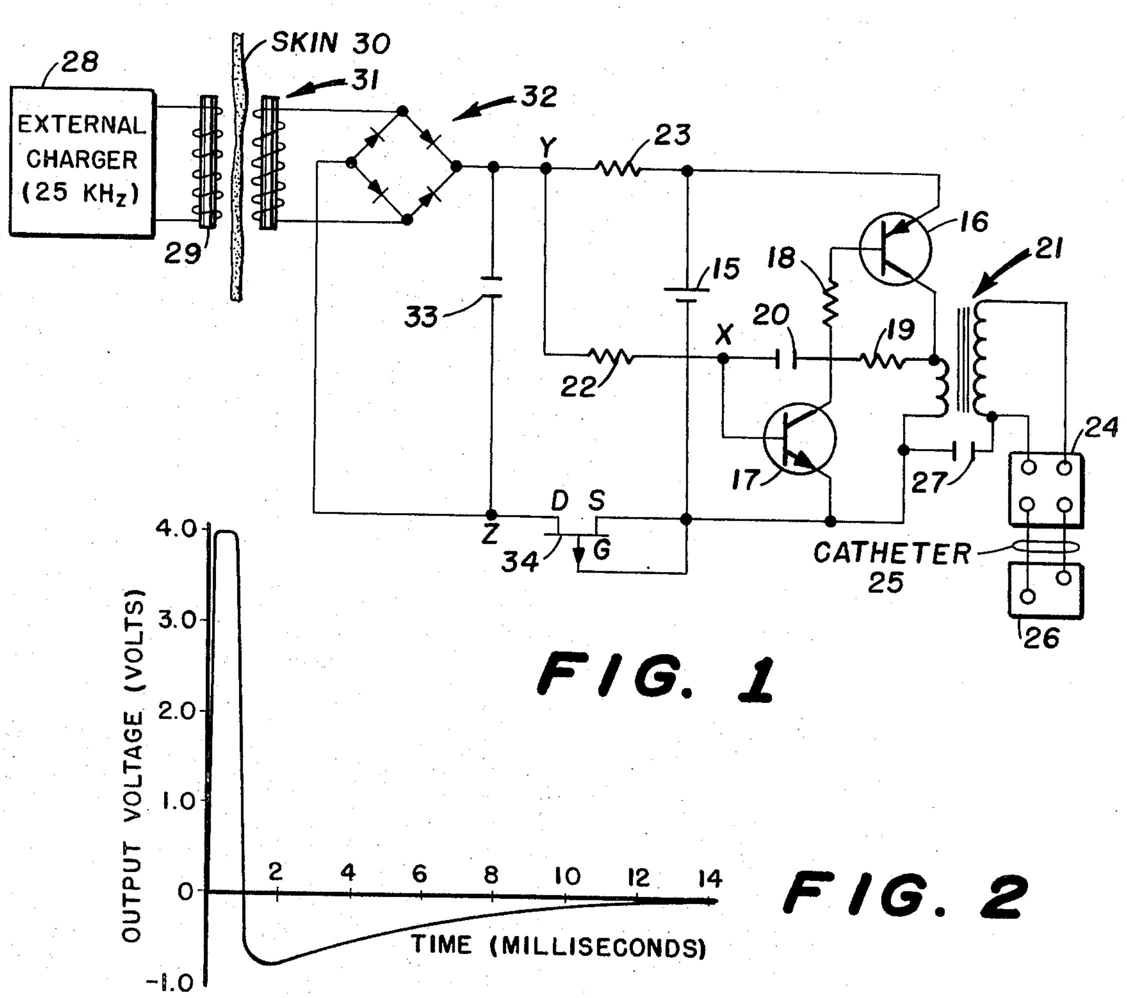
FIG. 1 is a diagram of circuitry constituting one embodiment of the proposed rechargeable fixed-rate cardiac pacer or stimulator.
FIG. 2 is a waveform diagram showing a typical output voltage pulse produced by the pacer embodiment of FIG. 1.

As illustrated in FIG. 1 of the drawings, the presently preferred embodiment of the proposed cardiac pacer basically comprises: a rechargeable, single cell nickel-cadmium battery 15 and pulse generator circuitry formed of transistor pair 16–17 which is powered by the Ni—Cd cell 15 to generate output heart stimulating pulses at the desired pulsing rate. By way of example, the battery or cell 15 might produce a nominal 1.25 volts and be rated at 200 milliamp-hours. The single cell construction for battery 15 is preferable to a multi-cell design in that the single cell provides the highest ratio of active chemical materials volume to case volume and also a higher degree of reliability. Moreover, in the multi-cell battery, complete discharge can result in permanent damage to that cell in the series string that has the least capacity; whereas, with a single cell even though it may be accidentally completely discharged, it can be readily recharged with no damage whatsoever. The single Ni-Cd cell is also readily recharged by magnetic induction without penetration of the patient's skin.

The pulse generating circuit comprising transistor pair 16 and 17 is connected essentially in the form of a relaxation type oscillator circuit. More specifically, the base of the PNP transistor 16 is connected through resistor 18 to the collector of the other transistor 17 which is of NPN type; the emitter of transistor 16 is connected to the positive terminal of the Ni-Cd cell 15; and, the collector of transistor 16 is connected, on the one hand, to the base of transistor 17 through resistor 19 and series capacitor 20 and, on the other hand, to one end of the primary winding of a suitable 1:4 step-up output transformer 21. The other end of the primary winding is connected to the emitter of transistor 17 and the negative terminal of cell 15. The base of the transistor 17 is also connected through a relatively large value resistor 22 to the left-hand end of a small value resistor 23 (e.g. 3 ohms) which at its opposite end, is connected to the positive terminal of cell 15. The secondary winding of the output transformer 21 is connected by means of a suitable connector unit designated as 24 to a catheter 25 of conventional design such as the Medtronic No. 5816 catheter which terminates in a bipolar electrode 26. It should be noted that the output transformer 21 has been illustrated as an iron core transformer and that its primary and secondary windings are D.C. isolated from one another, for reasons to be described in more detail hereinafter. On the other hand, a capacitor 27 is connected across the lower ends of the primary and secondary windings of the output transformer 21 for the purpose of preventing undesirable A.C. noise from appearing on the catheter 25, for example during recharging of the Ni-Cd cell 15.

Having described how the pulse generating circuitry of FIG. 1 is connected, attention will now be directed to the operation of this circuitry during generation of the output heart stimulating pulses. Assuming, for example, that both of the transistors 16 and 17 are initially cut-off and capacitor 20 is discharged. It will be noted that a charging circuit for capacitor 20 exists between the opposite terminals of the Ni-Cd cell 15, through resistors 19, 22 and 23 and the primary winding of the output transformer 21. The resistor 22 has a value (e.g. 1.2 megohms) which is very much greater than any of the other resistor values in this charging circuit so that the rate at which capacitor 20 now charges is predominately controlled by the value of resistor 22. As will be explained in more detail hereinafter, the RC timing circuit thus formed by capacitor 20 and resistor 22 determines essentially the interpulse period for the pulse generator circuitry and therefore the rate at which the heart is stimulated (i.e. patient's pulse rate).

The capacitor 20 thus charges towards the supply voltage represented by the Ni-Cd cell 15 until the voltage at the base of transistor 17 reaches a predetermined threshold level (e.g. 0.7 volts) at which time the transistor 17 begins conduction. The flow of collector current in the transistor 17 draws base current at transistor 16 through resistor 18 and thereby turns transistor 16 on. As a result of regenerative feedback between transistors 16 and 17, the collector voltage for transistor 16 immediately rises (output pulse has fast rise time) to a voltage level only slightly less than the Ni-Cd cell voltage.

This rise in the collector voltage for transistor 16 causes the capacitor 20 to begin charging in an opposite direction so that the value of the voltage on the base of transistor 17 eventually is reduced below a second preselected threshold level (e.g. 0.6 volts) at which time the transistor 17 is turned off and this, in turn, regeneratively cuts off the other transistor 16 (output pulse has fast fall time). The circuitry is thus once again returned to its initial condition wherein the collector of transistor 16 is essentially at the voltage level of the negative terminal of the Ni-Cd cell 15. Once again therefore, the capacitor 20 would begin charging towards the supply voltage, as previously discussed, with the time constant determined primarily by resistor 22 and capacitor 20.

As a result of this operation of the pulse generating circuitry, a series of positive-going trigger pulses appear across the secondary of output transformer 21, each being approximately 4 volts in amplitude and having a pulse width of approximately 1 millisecond, as shown in the typical waveform of FIG. 2. The action of the output transformer 21 causes the output pulses to have a negative going portion of approximately the same area as the positive-going heart triggering pulse portion. This is quite desirable since it accomplishes the desired triggering of the heart while preventing any net ion flow in the blood near the bipolar electrodes 26.

In accordance with the present invention, the necessary periodic recharging of the illustrated Ni-Cd cell 15 is accomplished by utilizing an external charger unit 28 of any conventional design operating at an ultrasonic charging frequency of approximately 25 kilohertz (kHz) and being equipped with a suitable charging head 29 capable of coupling the ultrasonic frequency charging energy through the patient's skin 30, by magnetic induction. The charger 28 might, for example, first convert the 60 Hz line power to D.C. and then invert it to the desired 25 kHz for more efficient charging.

It should be noted that in the past there have been several unsuccessful attempts to use inductively rechargeable pacemakers which have failed primarily because of the attempted use of an R.F. frequency for coupling energy into the pacer or stimulator through the patient's skin. Specifically, the R.F. energy has caused considerable heating of the skin resulting primarily as a result of absorption of the relatively high frequency electromagnet waves into the conducting tissue of the skin. By utilizing a lower, ultrasonic frequency such as 25 kHz, it is possible to couple more than enough energy to recharge the single Ni-Cd cell in a short period of time and without this undesirable heating of the skin. On the other hand, frequencies below ultrasonic are undesirable in that they require much larger components to receive the inductively coupled energy and also result in pyschologically undesirable vibrations that may be detectable by the patient's ear or by the nerves surrounding the pacer.

The Ni-Cd cell 15 obtains its 25 kHz charging energy input by means of magnetic induction coupling between the charging head 29 and an input transformer 31 positioned adjacent the patient's skin 30. The input transformer 31 is formed of a thin sheet or core of suitable ferrite material around which is wrapped many turns of copper wire.

Figure 4:
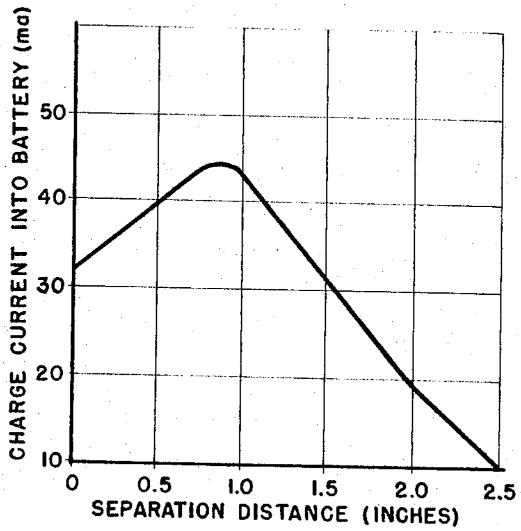
FIG. 4 is a graph showing battery charge current as a function of the separation distance between the charging head and the input transformer.

Across the output of the input transformer 31 is connected a conventional diode full-wave rectifier bridge circuit 32 which converts the periodic input charging energy into a D.C. charging current. A suitable filter capacitor 33 is connected across the output full-wave rectifier circuit 32 (points Y and Z in FIG. 1) to remove any undesired ripple in the rectifier output. The drain (D) element of an N-channel type field effect transistor 34 is also connected to point Z and the gate (G) and source (S) elements of the field effect transistor 34 are tied together and connected to the negative terminal of the Ni-Cd cell 15. In this manner, the FET 34 acts in a well-known manner to limit the charging current to the cell 15 to a level (e.g. 40 milliamps) at which the cell 15 can be continuously charged without damage to the cell or the pulse generator circuitry. As noted in FIG. 4 of the drawings, in one practical application of the present invention it was observed that the necessary charging current value of 40 ma. could be supplied even though the distance between the patient's skin 30 and the external charger 28 varied between 0.5 inch and about 1.2 inches. The fall-off in charging current at a distance less than 0.75 inch is apparently a result of heating of the current limiting field effect transistor 34, causing an increase in its ohmic resistance.

Figure 7:
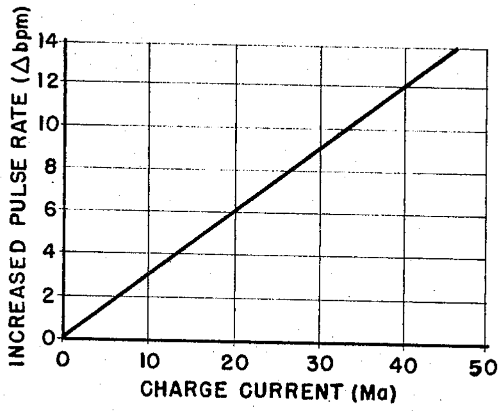
FIG. 7 is a graph illustrating the output pulse rate as a function of charging current.

As mentioned previously, a small value (e.g. 3 ohm) resistor 23 is connected in series in the charging circuit to the Ni-Cd cell 15, between the positive terminal of the cell and one side of the resistor 22 (point Y in FIG. 1). The purpose of this resistor 23 is to develop a voltage drop during charging which, in effect, increases the rate at which capacitor 20 charges to the conducting threshold level of transistor 17; i.e. it decreases the interpulse period and thus increases the output pulse rate from the pulse generating circuitry. This enables the patient and/or the attending physician to detect that the recharging operating is properly taking place, by merely monitoring the resultant increase in pulse rate. FIG. 7 of the drawings illustrates the increased pulse rate experienced in one practical application of the proposed pacer as a function of battery charge current.

Figure 5:
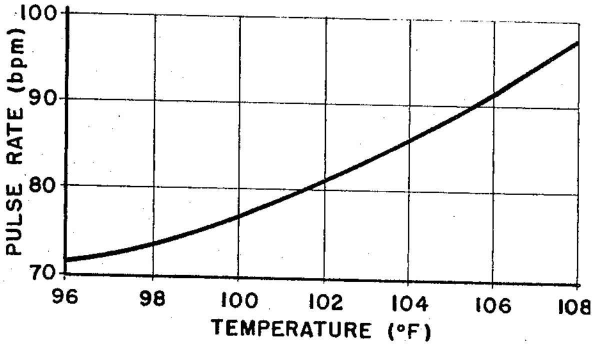
FIG. 5 is a graph illustrating the variation in pulse rate with pacer temperature.

As shown in FIG. 5, another desirable and novel feature of the proposed cardiac pacer is that the output pulse rate from the pulse generator circuitry is also temperature dependent. This enables the output pulse rate to provide an indication of the patient's body temperature; i.e., if the patient has a high temperature, the output pulse rate will increase, thus simulating natural heart functioning. Although there are obviously many ways of rendering the output pulse rate from pulse generator circuitry of FIG. 1 temperature dependent, the presently preferred method of accomplishing this is by utilizing a charging capacitor, at 20, having a high temperature coefficient. A commercially available barium titanate ceramic capacitor has proven satisfactory for this purpose.

Figure 6:
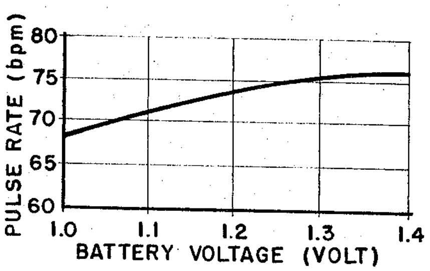
FIG. 6 is a graph illustrating the dependence of pulse rate on battery or cell voltage.

One further aspect of the illustrated pacemaker circuitry is worthy of notes; namely, there is also a dependence between the ouput pulse rate and the voltage of battery or cell 15 as indicated in FIG. 6. This results from the fact that the charging rate of capacitor 20 varies directly, as previously discussed, with the existing battery voltage and this therefore allows a monitoring physician to obtain a indication of the battery voltage by means of the detected pulse rate of the patient. For example, in one practical application, the normal operating range for battery voltage is from 1.35 volts immediately after being charged to 1.2 volts after one week of discharge. During this period the patient's pulse rate will decrease from approximately 76 to approximately 74 beats per minute. If, on the other hand, a patient observes a pulse rate of 70 pulse beats per minute or less in less than one week after charging, it is indicative of potential cell failure and could be cause for pacer replacement.

As previously discussed, the output pulsing rate produced by the pulse generating circuitry of FIG. 1 depends primarily upon the R.C. charging time constant represented by resistor 22 and capacitor 20. In the modification shown in FIG. 3 of the drawings, the single resistor 22 is replaced by a plurality of resistors **22*a*,** *b* and *c* shown connected in series between circuit points X and Y which correspond to similarly designated circuit points in FIG. 1. A pair of minature magnetic latching relays 35 and 36, of well-known design, are associated with resistors **22*b*** and *c* respectively and selectively control whether the resistors **22*b*** and *c* either are shorted out or add to the series resistance between circuit points X and Y in FIG. 3.

More specifically, each latching relay has an associated pair of control windings represented, for example, at **35*a*** and *b* which, when energized, actuate the relay contact element to its closed and open-circuit positions respectively. In the closed contact position, the associated resistor **22*b* is short-circuited; whereas, in the open contact position, resistor 22*b* adds to the series resistance between points X and Y, in the charging circuit for capacitor 20. Each of the magnetic latching relays 35 and 36** is capable of retaining or latching its contact element in the last operating position to which it has been actuated until the other winding of the relay is energized to actuate the contact element to its opposite position.

Figure 3:
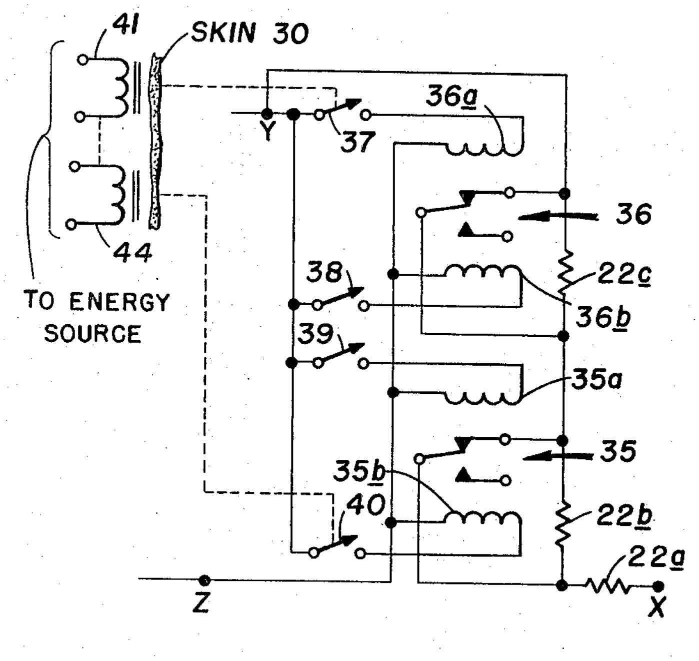
FIG. 3 is a circuit diagram illustrating one modification of the rechargeable cardiac pacer of FIG. 1 whereby the output pulsing rate is remotely controllable.

The selective energization of the control winding pairs **35*a–b* and 36*a–b* for the latching relays 35 and 36 is preferably controlled by reed switches 37, 38, 39 and 40 which are each connected in parallel to circuit point Y in FIG. 3 and in series with one of the control windings. Actuation of these reed switches is accomplished, in FIG. 3, by means of selectively energizable external coils 41–44, one of which is associated with a different reed switch 37–40. For example, as represented in FIG. 3 by the dotted line, selective energization of coil 44 (by a suitable source, not shown) causes reed switch 40 to close and thereby energize control winding 35*b*** by connecting it across circuit points Y and Z, at the output of the full-wave rectifier (see FIG. 1). The contact element of latching relay 35 would therefore be moved to its lower or open position and thus connect resistor 22*b* in series in the charging circuit (points X and Y) for the timing capacitor 20 and thus cause an associated decrease in the output pulse rate from the pulse generating circuitry of the pacer. In FIG. 3, it should be noted that a total of four different pulse rate values may be remotely or externally selected in the foregoing manner.

The mechanical structure of one embodiment of the proposed fixed-rate rechargeable cardiac pacer is illustrated in FIGS. 8 through 12 of the drawings. Before describing these structural details, however, one method of forming the assembled pacer structure should be noted. More specifically, the initial step in fabricating the illustrated embodiment is to dip or otherwise coat the assembled electronic components, including the output transformer and the printed circuit boards (together with their interconnected bulk components), in a suitable silicon rubber such as the well-known Silastic compound. This initial rather soft coating protects the electronic components against the stressing associated with a harder encapsulation such as epoxy. The second step utilized in fabricating the illustrated pacer of FIGS. 8 through 12 is to pot the Ni-Cd battery and the electronic components with such a hard encapsulation, in order to improve mechanical strength. Subsequently, a metal housing is then placed around the unit to hermetically seal it against body fluids, as well as to provide a shielding against electromagnetic interference. By way of example, this metal housing can be attained by an 8–10 mils gold plating operation or by performing the epoxy potting in a pre-form metal (e.g. nickel) can and then welding on metallic cover to complete the hermetic seal. In either event, the next step in pacer unit fabrication is to connect the assembled catheter across the secondary of the output transformer and the input transformer to the input of the electronic circuitry (see FIG. 1). A second hard epoxy potting is then employed, if necessary, to obtain the desired pacemaker body configuration and finally, a so-called "conformal coating" of a suitable medical Silastic is applied to make the pacer more compatible with living tissue.

Figure 8:
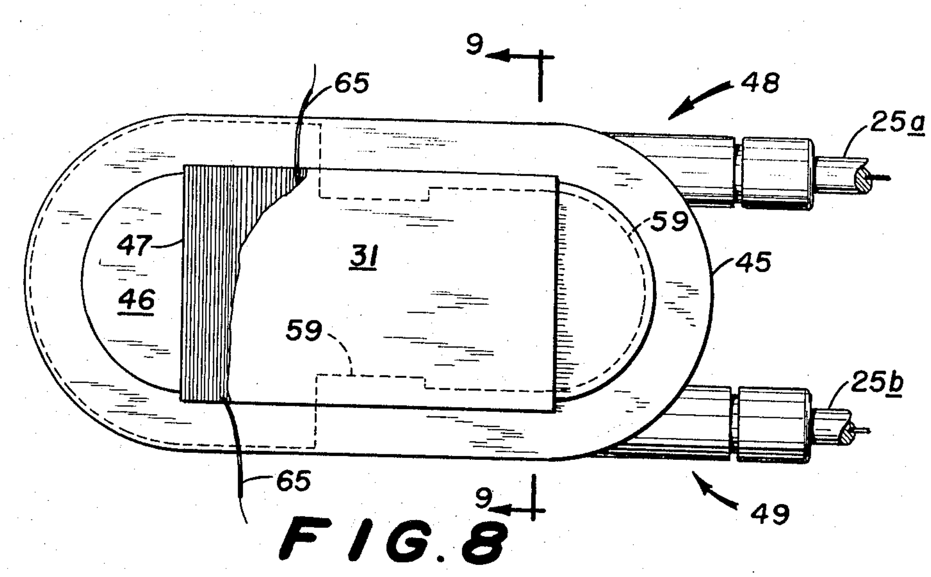
FIG. 8 is a top view of a cardiac pacer structure embodying the present invention.

In the illustrated embodiment of FIG. 8, the pacer body which results from the foregoing fabrication method is designated at 45. Mounted on top of the body 45 is the input transformer 31 (see FIG. 1) formed of a thin, oblong sheet 46 of suitable ferrite material and a winding 47 of copper wire. It should be noted here that the input transformer 31 is generally covered, in the completely fabricated pacemaker unit, by the second epoxy coating and the final conformal coating. However, in order to more clearly illustrate the details of the input transformer 31, these final two coatings have been omitted at the top of the unit shown in FIG. 8.

Figure 10:
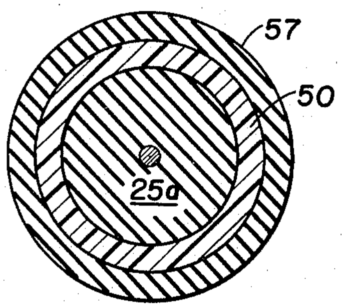
FIG. 10 is an enlarged end view of the catheter connection assembly.
Figure 11:
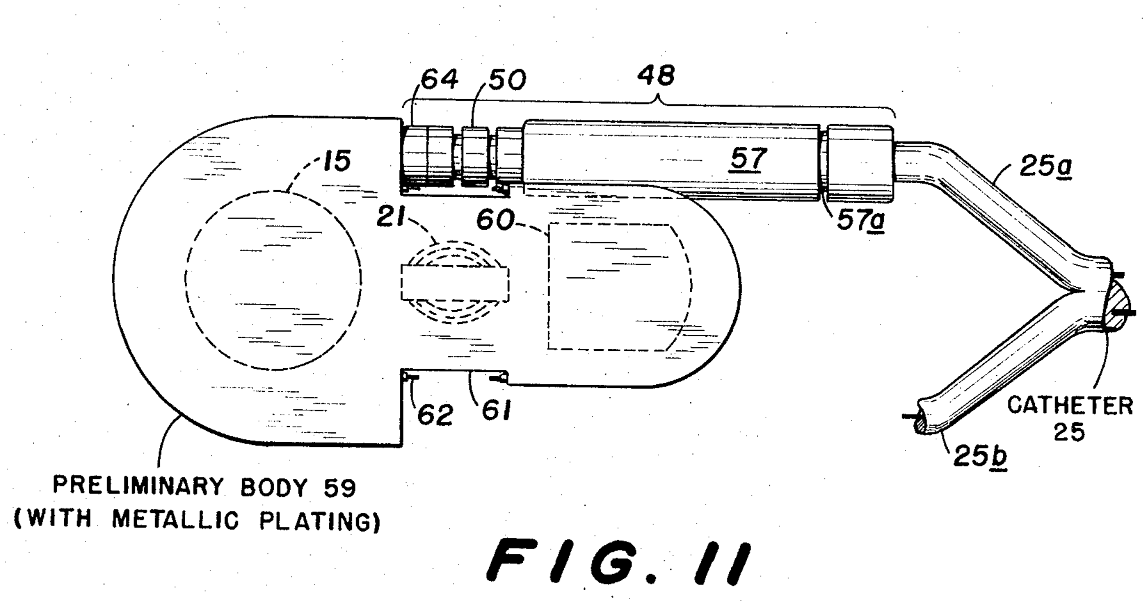
FIG. 11 is a top view of the cardiac pacer unit shown in FIG. 8 with certain parts removed in order to illustrate in more detail the interior electronic components of the pacer and the manner of connecting the catheters to the pacer body.
Figure 12:
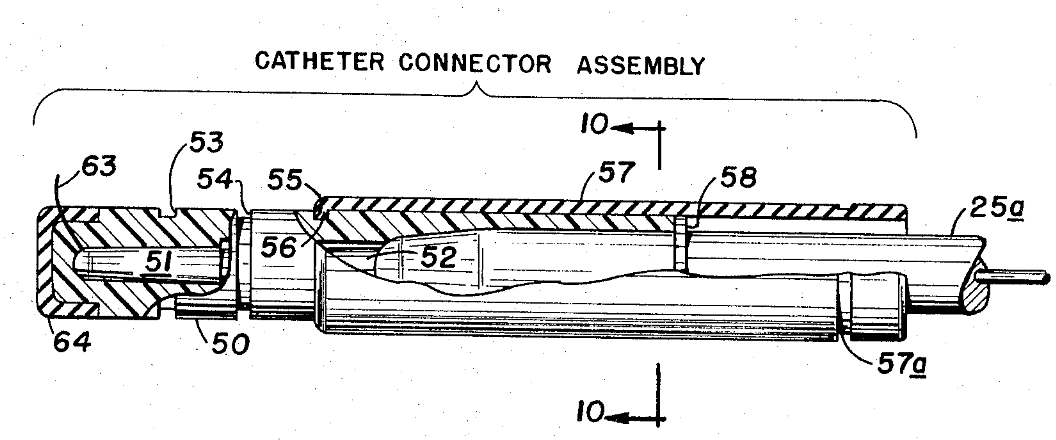
FIG. 12 is an enlarged side view partially in section of a catheter connecting assembly.

Extending from the illustrated right-hand end of the pacer body 45 are two catheter connector assemblies 48 and 49; one for each of the two illustrated catheter lead-in wires 25*a* and 25*b* which branch out from the main body of the catheter 25, as best shown in FIG. 11. The connector assemblies 48 and 49 correspond collectively to the unit 24 in FIG. 1. As mentioned previously, one form of catheter suitable for use with the proposed pacer is the type known as Medtronic No. 5816. The catheter lead-ins 25*a* and *b* each contain a single wire coaxially located within an insulating silicon rubber body (see cross-sectional view of FIG. 10).

The details of the catheter connection assembly are best illustrated in FIG. 7 of the drawings. A first member 50, formed of a suitable high dielectric strength plastic such as that manufactured under the tradename "Kel-f", contains a suitable female electrical connection member 51 implanted at its left-hand end in FIG. 7 to receive the prong or tip 52 at the end of the catheter wire, when in assembled position. On the outer periphery of the connector member 50 are formed three closely spaced notches 53, 54 and 55. Two of these notches 53 and 54 are for the purpose of facilitating anchoring of the catheter connector assembly to the pacemaker body during fabrication; whereas, the third groove 55 is adapted to be engaged by an inwardly extending flange 56 formed on the inside of the silicon rubber sleeve 57. The inside of the plastic connector member 51 is contoured so as to facilitate insertion of the prong 52 at the end of the catheter lead-in 25*a* or *b* into the female connector element 51. The catheter lead-in is also provided with a peripheral shoulder 58 which abuts against the right-hand edge of the plastic connector member 51 when the catheter lead-in has been inserted to the proper depth within the connector assembly. Sleeve member 57 is provided with a peripheral groove 57*a* adjacent its right-hand end to accommodate a suture which secures the sleeve 57 to the catheter lead-in. An enlarged cross-sectional view of the assembled catheter connector assembly is shown in FIG. 10.

Figure 9:
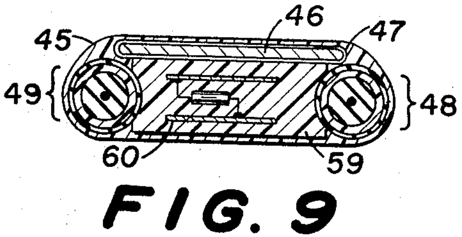
FIG. 9 is a sectional view taken along the line 9—9 in FIG. 8 and viewed in the direction of the arrows.

As is best shown in FIGS. 9 and 11, the completed catheter connector assemblies 48 and 49 mounted against the concave sides of the preliminary body 59 during fabrication of the pacer. As previously mentioned, this preliminary body is molded around the nickel-cadmium cell 15, the output transformer 21 and two printed circuit boards (and the associated circuit components) 60, by utilizing a suitable epoxy potting compound and an appropriate mold. As also discussed, the electronic components implanted within preliminary body 59 would preferably have been previously dipped in a suitable Silastic compound, in order to protect the components against the stresses associated with hard (epoxy) encapsulation. In order to obtain the desired combination hermetic seal/electromagnetic shield for the pacemaker, the preliminary body 59 would, during fabrication, be appropriately metal plated with 8–10 mils of gold, for example. As an alternative, the epoxy potting can be performed in a metallic (e.g. nickel) can and the top subsequently welded on to form the seal/shield.

The preliminary epoxy body 59 is formed with a cut-out section on either side (for example, cut-out portion 61) each of which is provided with a pair of electrical connector pins 62. Two of these connecting pins 62, on opposite sides of body 59, are connected to the lead-out wires from the catheter connector assemblies, such as is typically illustrated at 63 in FIG. 12 extending through Silastic end cap 64; whereas, the other two connector pins 62 are connected to the ends of the input transformer coil wire which are designated at 65 in FIG. 8. Obviously, the connector pins 62 should be electrically insulated from the metallic plating which applied to the preliminary body 59 as previously discussed. This can be accomplished, for example, by properly masking the connector pin 62 (and the immediately adjacent surface of body 59 if necessary) before the gold plating is applied. Similarly, the input transformer coil 47 is also formed of suitably insulated wire, as shown.

As previously mentioned, after the ends of catheter 25 and input transformer 31 have been properly positioned on the preliminary body 59 and properly connected electrically to the connector pins 62, this composite structure is then placed in another mold and more epoxy potting compound added to attain the desired pacer body configuration (see reference numeral 45 in FIGS. 8 and 9). Finally, the so-called conformal coating is applied to the unit to make it more suitable for implantation; i.e., so that the unit will not irritate the body tissues.

Various other modifications, adaptations and alterations are of course possible in light of the above teachings. Therefore, it should be understood at this time that within the scope of the appended claims the invention may be practiced otherwise than as specifically described.

What is claimed is:

1. A cardiac pacer adapted to be implanted in the body of a patient and comprising, in combination a D.C. voltage supply, pulse generating circuit means connected to said voltage supply for generating output heart stimulating pulses at a predetermined rate, catheter means equipped with electrode means for applying said output heart stimulating pulses to the patient's heart, an output transformer having primary and secondary windings which are D.C. isolated from one another, said primary winding being connected to receive the output heart stimulating pulses generated by said pulse generating circuit means, said secondary winding being connected to apply said output heart stimulating pulses to said catheter means, and filter capacitor means connected between the primary and secondary windings of said output transformer for preventing periodic signal noise from appearing at said catheter means.

2. The implantable cardiac pacer specified in claim 1 wherein said D.C. voltage supply is a rechargeable battery and further including, recharging means including means for coupling charging energy through the patient's skin to the rechargeable battery by magnetic induction.

3. The implantable cardiac pacer specified in claim 2 wherein said rechargeable battery is a single nickel-cadmium cell, and said recharging means includes a source of output charging energy operating at a preselected ultrasonic frequency of substantially 25 kilohertz, a magnetic charging head connected to receive the output charging energy of said source and transmit said energy through the patient's skin, a ferrite core input inductive coupling means for receiving said transmitted energy following passage through the patient's skin, and rectifier means connecting electrically said inductive coupling means to said battery.

4. The cardiac pacer specified in claim 1 wherein said pulse generating circuit means includes temperature sensitive circuit means selected to control said output pulse rate to vary in direct proportion with ambient temperture and thereby simulate natural heart beat variation as a function of temperature.

5. The cardiac pacer specified in claim 1 wherein said pulse generating circuit means includes, a timing circuit formed of a resistor and a serially connected capacitor to determine said output pulse rate, said capacitor having a high temperature coefficient effective to cause said output pulse rate to increase with increasing ambient temperature.

6. A cardiac pacer adapted to be implanted in the body of a patient and comprising, in combination, a rechargeable, single cell battery, pulse generating means connected to receive operating voltage from said battery for generating output heart stimulating pulses at a predetermined rate and including a timing circuit which determines said output pulse rate, said timing circuit including a resistance means and a serially connected charging capacitor having a high temperature coefficient effective to cause said output pulse rate to vary directly as a function of the pacer's ambient temperature, said timing circuit being operably connected to said battery to cause the charging rate of said capacitor and the output pulse rate to vary directly as a function of battery voltage, control means for controlling externally of the patient's body the resistance value of said resistance means to selectively vary said output pulse rate, catheter means equipped with electrode means for applying said output heart stimulating pulses to the patient's heart, an output transformer having a primary winding connected to receive the output pulses generated by said pulse generating means and a secondary winding which is D.C. isolated from said primary winding and which is connected to apply said output pulses to said catheter means, a first molded, encapsulating unitary body of epoxy surrounding said battery, said pulse generating circuitry and said output transformer, a metallic housing formed around the exterior surface of said first epoxy body, said first epoxy body being provided with a plurality of electrical connector means mounted thereon and insulated from said metallic housing, certain of said electrical connector means connecting the secondary winding of said output transformer to said catheter means, an input inductive coupling means mounted on said metallically housed first epoxy body external to said metallic housing and being formed of a ferrite core and an energizable coil of insulated wire wound around said core and having its wire ends connected by others of the electrical connector means provided on said epoxy body to supply charging energy to said battery, a second molded, encapsulating body of epoxy surrounding said metallically housed first epoxy body, said input inductive coupling means and said catheter means adjacent the connection of said catheter means to said electrical connector means, and external charging means including a source of charging energy operating at a predetermined ultrasonic frequency of substantially twenty-five kilohertz and a charging head means connected to couple said charging energy to said input inductive coupling means by magnetic induction through the patient's skin.

7. A cardiac pacer adapted to be implanted in a patient and comprising, in combination, a D.C. voltage supply, pulse generating circuit means connected to said voltage supply for generating output heart stimulating pulses at a predetermined rate, and catheter means equipped with electrode means connected to receive and apply said output heart stimulating pulses to the patient's heart, said pulse generating circuit means including a timing circuit to determine said output pulse rate and comprising a resistor and capacitor connected serially with said voltage supply, said capacitor being charged repetitively from said voltage supply at a rate dependent on the existing voltage level of said supply, said pulse generating circuit means including means responsive to the voltage charged on said capacitor and render effective to generate an output pulse each time said capacitor has charged to a preselected threshold voltage, said output pulse rate being dependent upon the time required by said capacitor to charge to said preselected threshold voltage, said capacitor having a high temperature coefficient selected to control the rate at which said capacitor charges to said preselected threshold voltage to also vary in direct proportion with ambient temperature whereby said output pulse rate is dependent upon the existing voltage level of said voltage supply and simulates natural heart beat variation as a function of the patient's internal temperature.

8. An implantable cardiac pacer adapted to be recharged from an external energy source and comprising, in combination, a rechargeable battery, pulse generating circuitry means connected to receive operating voltage from said battery for generating output pulses, pulse applying means equipped with electrode means adapted to apply pulses to the patient's heart, an output transformer having primary and secondary windings connected to receive said output pulses from said pulse generating circuitry and couple them to said pulse applying means, a metallic housing forming a hermetic seal around said battery, said pulse generating circuitry and said output transformer, an inductive coupling means disposed external to said metallic housing for receiving recharging energy from said external source, rectifier means operably connected between said inductive coupling means and said rechargeable battery, and a plurality of electrical connector means mounted in and extending through and insulated from said metallic housing, certain of said plurality of electrical connector means connecting the secondary winding of said output transformer to said pulse applying means, others of said plurality of electrical connector means connecting said inductive coupling means electrically to said rechargeable battery via said rectifier means.

9. The implantable cardiac pacer specified in claim 8 further including a molded, encapsulating body of potting material disposed within said metallic housing and surrounding said battery, said pulse generating circuitry and said output transformer.

10. The implantable cardiac pacer specified in claim 9 wherein said metallic housing is formed by gold plating and said potting material is epoxy.

11. The implantable cardiac pacer specified in claim 9 wherein said inductive coupling means includes a ferrite core and an energizable coil of insulated wire wound around said core and having its ends connected electrically by said others of said plurality of electrical connector means and said rectifier means to said battery, said pulse applying means is a catheter means, the respective configurations of said input inductive coupling means and said metallically housed molded body being substantially similar to permit said input inductive coupling means to be mounted in juxtaposition against said metallically housed body, and further including a second molded, encapsulating body of potting material surrounding said metallically housed body, said input inductive coupling means, and said catheter means adjacent the connection of said catheter means to the electrical connector means provided on said metallically housed body.

12. The implantable cardiac pacer specified in claim 11 further including, an external charger operating at a predetermined ultrasonic frequency for coupling periodic charging energy to said input inductive coupling by magnetic induction, and wherein said rectifier means operably connected between said input inductive coupling means and said battery converts said periodic charging energy into direct current charging energy.

13. The implantable pacer specified in claim 11 wherein said metallically housed body has a substantially rectangular configuration with substantially flat top and bottom surfaces and concave side surfaces, said ferrite core is of a flat, substantially rectangular configuration and is mounted flat against the flattened top surface of said metallically housed body, and said catheter means comprises an insulative body containing a pair of wires terminating, at one end, at electrode means and branching out, at the other end, as two individual insulated wires, and a pair of connector assemblies, each adapted to be connected at the branched end of one of said two insulated wires and having a substantially cylindrical shape configured to mate with the concave side surfaces of said metallically housed body, said second body of potting material surrounding at least a portion of said connector assembly pair to anchor said catheter means.

14. The implantable cardiac pacer specified in claim 11 further including a coating of medical Silastic material encapsulating said second body of potting material for making said pacer unit compatible with the patient's body tissue.

15. A cardiac pacer adapted to be implanted in a patient and comprising, in combination, a D.C. voltage supply, transistorized pulse generating circuit means connected to said voltage supply for generating output heart stimulating pulses at a predetermined rate and including a pair of transistors each having collector, emitter and base elements and regenerative feedback circuit means interconnecting the collector, emitter and base elements of said transistor pair, and catheter means equipped with electrode means connected to receive and apply said output heart stimulating pulses to the patient's heart, said pulse generating circuit means including a timing circuit to determine said output pulse rate and comprising a resistor and capacitor connected serially with said voltage supply, said capacitor being charged repetitively from said voltage supply at a rate dependent on the existing voltage level of said supply, one side of said charging capacitor being connected to the base element of one of said transistors to effect conduction in said one transistor and cause said pulse generating circuit means to generate an output pulse each time said capacitor has been charged to a preselected threshold voltage, said output pulse rate being dependent upon the time required by said capacitor to charge to said preselected threshold voltage, said capacitor having a high temperature coefficient selected to control the rate at which said capacitor charges to said preselected threshold voltage to also vary in direct proportion with ambient temperature whereby said output pulse rate is dependent upon the existing voltage level of said voltage supply and simulates natural heart beat variation as a function of the patient's internal temperature.

* * * * *

UNITED STATES PATENT OFFICE
CERTIFICATE OF CORRECTION

Patent No. 3,867,950 Dated Feb. 25, 1975

Inventor(s) Robert E. Fischell

It is certified that error appears in the above-identified patent and that said Letters Patent are hereby corrected as shown below:

At Column 1, immediately following the title of the invention, the following paragraph should be added:

-- The invention described herein was made in the course of work under a grant or award from the Department of Health, Education and Welfare. --.

Signed and sealed this 29th day of April 1975.

(SEAL)
Attest:

RUTH C. MASON
Attesting Officer

C. MARSHALL DANN
Commissioner of Patents
and Trademarks